United States Patent
Kim

(10) Patent No.: US 11,941,682 B2
(45) Date of Patent: Mar. 26, 2024

(54) CAR RECOMMENDATION SYSTEM FOR CAR SHARING SERVICE AND METHOD THEREOF

(71) Applicants: Hyundai Motor Company, Seoul (KR); Kia Corporation, Seoul (KR)

(72) Inventor: Sojeong Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 164 days.

(21) Appl. No.: 17/569,104

(22) Filed: Jan. 5, 2022

(65) Prior Publication Data

US 2023/0079296 A1 Mar. 16, 2023

(30) Foreign Application Priority Data

Sep. 7, 2021 (KR) .......................... 10-2021-0119012

(51) Int. Cl.
*G06Q 30/00* (2023.01)
*G06Q 30/0601* (2023.01)

(52) U.S. Cl.
CPC ................ *G06Q 30/0631* (2013.01)

(58) Field of Classification Search
CPC ................................ G06Q 30/06–08
See application file for complete search history.

(56) References Cited

U.S. PATENT DOCUMENTS

2020/0126000 A1* 4/2020 Kim ................ G06Q 50/30
2022/0005140 A1* 1/2022 Beaurepaire ........ G06F 3/04847

* cited by examiner

*Primary Examiner* — Ethan D Civan

(57) ABSTRACT

A vehicle recommendation system recommends an eco-friendly vehicle over an internal combustion engine vehicle. The system includes a server that calculates a first recommendation score indicating suitability for recommendation of an eco-friendly vehicle based on a previously stored vehicle use record for the customer, receives vehicle use information for using the car sharing service from a customer terminal possessed by the customer, and calculates a second recommendation score indicating suitability for recommendation of the eco-friendly vehicle based on the vehicle use information. The server transmits recommendation information related to an internal combustion engine vehicle a hybrid vehicle, or an electric vehicle to the customer terminal based on at least one of a result of comparing the first recommended score with a predetermined first reference value or a result of comparing the second recommended score with a predetermined second reference value.

23 Claims, 8 Drawing Sheets

CAR RECOMMENDATION SYSTEM FOR CAR SHARING SERVICE AND METHOD THEREOF

CROSS-REFERENCE TO RELATED APPLICATION

This application claims priority to and benefits of Korean Patent Application No. 10-2021-0119012, filed on Sep. 7, 2021, the entire contents of which are incorporated herein by reference.

TECHNICAL FIELD

The present invention relates to a vehicle recommendation system and method for a car sharing service that preferentially recommends an eco-friendly vehicle over an internal combustion engine vehicle.

BACKGROUND

Car sharing is a service that allows an individual to conveniently use a vehicle that may be used jointly when needed by the individual. Unlike a car rental service, car sharing is capable of being used for a short period of time for registered members and may be used conveniently in various places in a city center, thus providing improved economy, mobility, and convenience.

Types of car sharing may be classified into peer to peer (P2P) private car sharing and business to customer (B2C) company-led car sharing. The former is a model developed into a system in which a privately owned vehicle is used by surrounding users during an idle time, and the surrounding users rent the vehicle for a short period of time. The latter is a model developed by the vehicle-related industry, which was stimulated by profits of private car-sharing. In the latter case, the business recently manages entire operation and service, including purchase of a vehicle.

Meanwhile, in relation to environmental protection, interest in eco-friendly vehicles such as electric vehicles or hybrid vehicles is high. In particular, electric vehicles are considered an important means of environmentally-friendly transportation that does not cause pollution, and state and local governments are encouraging consumers to purchase electric vehicles through subsidies. However, in the case of a service that customers use and return vehicles for a certain period of time without owning the vehicles, such as a car-sharing service and a rental car service, there is no service that preferentially recommends eco-friendly vehicles unless customers are looking for the eco-friendly vehicles. Accordingly, it is necessary to develop a system for preferentially recommending an eco-friendly vehicle when a customer uses a vehicle through a car-sharing service platform—to better realize the purpose of introducing the eco-friendly vehicle.

The above information disclosed in this section is merely for enhancement of understanding of the background of the invention, and therefore, it may contain information that does not form the prior art that is already known in this country to a person of ordinary skill in the art.

SUMMARY

The present invention has been made in an effort to provide a vehicle recommendation system and method for a car sharing service, capable of increasing a use rate of an eco-friendly vehicle by preferentially recommending the eco-friendly vehicle over an internal combustion engine vehicle to a customer likely to use the eco-friendly vehicle when providing the car sharing service.

A vehicle recommendation system that recommends a vehicle to a customer who wants to use a car sharing service may include a server configured to calculate a first recommendation score indicating suitability for recommendation of an eco-friendly vehicle based on a previously stored vehicle use record for the customer, to receive vehicle use information for using the car sharing service from a customer terminal possessed by the customer, and to calculate a second recommendation score indicating suitability for recommendation of the eco-friendly vehicle based on the vehicle use information, wherein the server is configured to transmit recommendation information related to an internal combustion engine vehicle a hybrid vehicle, or an electric vehicle to the customer terminal based on at least one of a result of comparing the first recommended score with a predetermined first reference value or a result of comparing the second recommended score with a predetermined second reference value.

A vehicle recommendation method that recommends a vehicle to a customer who wants to use a car sharing service may include: determining whether the customer has already used a vehicle more than a predetermined reference number of times; calculating a first recommendation score indicating suitability for recommendation of an eco-friendly vehicle based on a re-stored vehicle use a record of the customer when the customer has used the vehicle more than the reference number of times as a result of the determination; determining whether the first recommendation score is greater than or equal to the first reference value; calculating a second recommendation score indicating suitability for recommendation of the eco-friendly vehicle based on vehicle use information input by the customer through the customer terminal when the first recommended score is equal to or greater than the first reference value as a result of the determination; determining whether the second recommendation score is greater than or equal to a second reference value; and transmitting recommendation information related to a plurality of electric vehicles corresponding to a predetermined recommended number to the customer terminal when the second recommendation score is equal to or greater than a second reference value as a result of the determination.

According to the present invention, even when a customer does not directly select an eco-friendly vehicle, the eco-friendly vehicle may be recommended to the customer to increase a use rate of the eco-friendly vehicle. According to the present invention, an electric vehicle or a hybrid vehicle may be recommended to a customer based on a first recommendation score and a second recommendation score indicating the suitability of an eco-friendly vehicle, thereby increasing acceptance probability of the customer for recommendation of the eco-friendly vehicle.

DETAILED DESCRIPTION OF THE EMBODIMENTS

Figure 1:
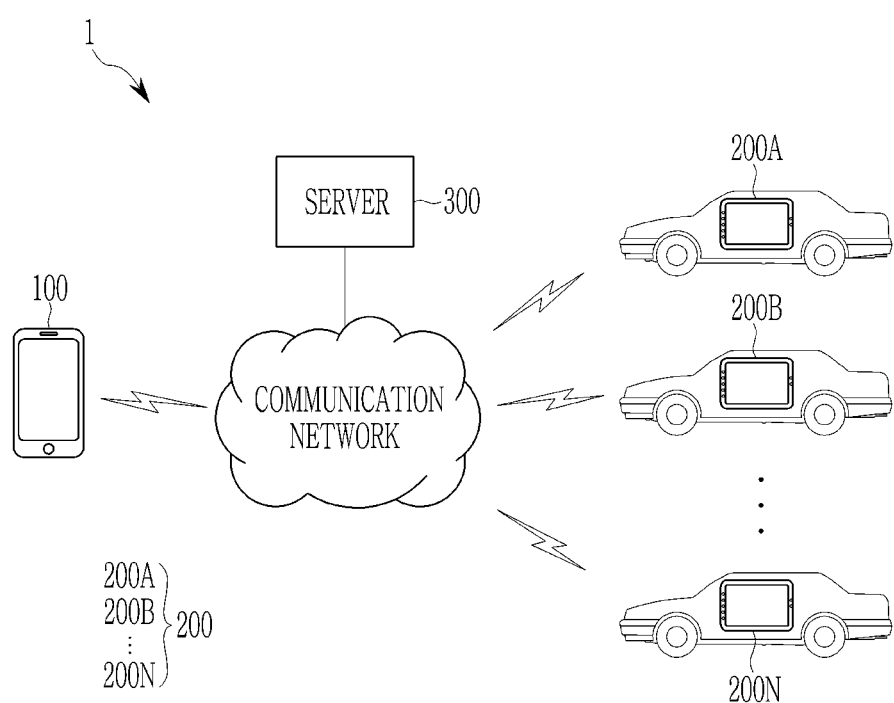
FIG. 1 illustrates a view for describing a vehicle recommendation system for a car sharing service according to an embodiment.

Hereinafter, embodiments disclosed in the present specification will be described in detail with reference to the accompanying drawings. In the present specification, the same or similar components will be denoted by the same or similar reference numerals, and a repeated description thereof will be omitted. Terms "module" and/or "unit" for components used in the following description are used only in order to easily describe the specification. Therefore, these terms do not have meanings or roles that distinguish them from each other in and of themselves. In describing embodiments of the present specification, when it is determined that a detailed description of the well-known art associated with the present invention may obscure the gist of the present invention, it will be omitted. The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components. It is to be understood that when one component is referred to as being "connected" or "coupled" to another component, it may be connected or coupled directly to the other component or be connected or coupled to the other component with a further component intervening therebetween. On the other hand, it is to be understood that when one component is referred to as being "connected or coupled directly" to another component, it may be connected to or coupled to the other component without another component intervening therebetween.

It will be further understood that terms "comprises/includes" or "have" used in the present specification specify the presence of stated features, numerals, steps, operations, components, parts, or a combination thereof, but do not preclude the presence or addition of one or more other features, numerals, steps, operations, components, parts, or a combination thereof.

Figure 2:
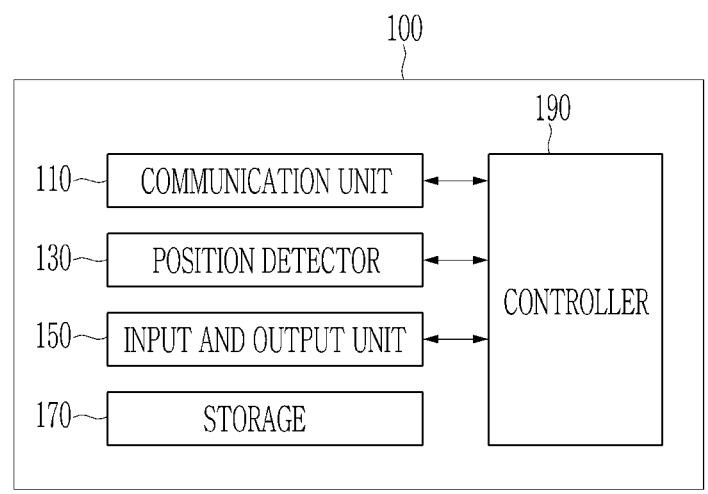
FIG. 2 illustrates a block diagram showing a configuration of a customer terminal of FIG. 1 in detail.
Figure 3:
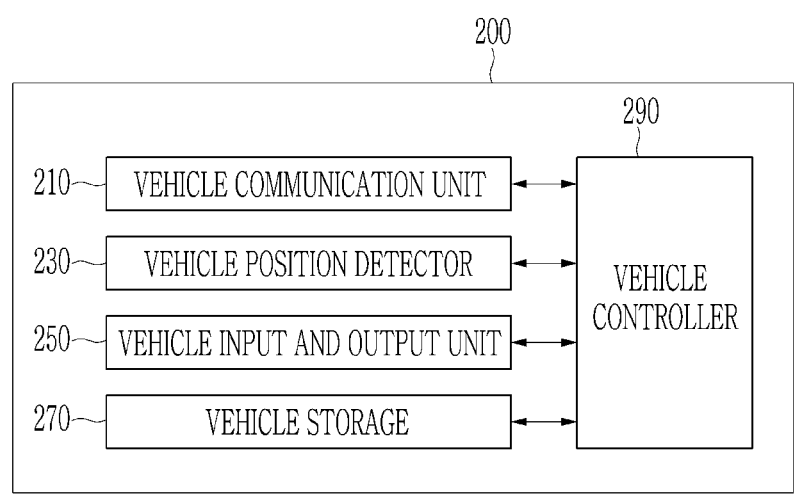
FIG. 3 illustrates a block diagram showing a configuration of a vehicle terminal of FIG. 1 in detail.
Figure 4:
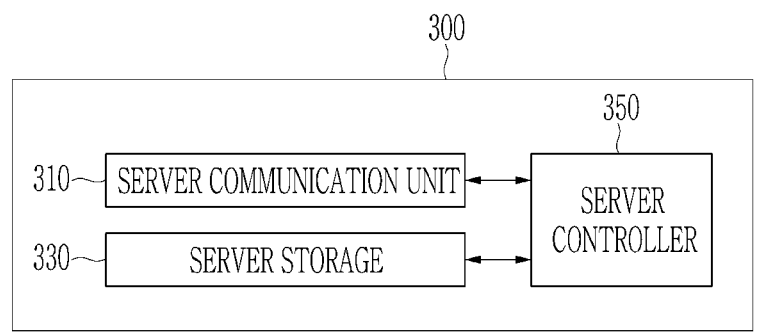
FIG. 4 illustrates a block diagram showing a configuration of a server of FIG. 1 in detail.

FIG. 1 illustrates a view for describing a vehicle recommendation system for a car sharing service according to an embodiment, FIG. 2 illustrates a block diagram showing a configuration of a customer terminal of FIG. 1 in detail, FIG. 3 illustrates a block diagram showing a configuration of a vehicle terminal of FIG. 1 in detail, and FIG. 4 illustrates a block diagram showing a configuration of a server of FIG. 1 in detail.

Referring to FIG. 1, a vehicle recommendation system 1 for car sharing may include a customer terminal 100, a vehicle terminal 200, and a server 300. The customer terminal 100 is a terminal device possessed by a customer using a car sharing service. In FIG. 1, the customer terminal 100 is illustrated as a smart phone, but the present invention is not limited thereto. For example, the customer terminal 100 may include a desktop PC, a tablet PC, a slate PC, a notebook computer, a digital broadcasting terminal, a personal digital assistant (PDA), a portable multimedia player (PMP), a navigation device, a digital camera, an MPEG layer 3 player (MP3P), and the like. In addition, a terminal that is applicable to the customer terminal 100 is not limited to the above-described type, and it is natural that all terminals capable of communicating with an external device may be included.

Referring to FIG. 2, the customer terminal 100 may include a communication unit 110, a position detector 130, an input and output unit 150, a storage 170, and a control unit 190. The communication unit 110 may be connected to a communication network to transmit and receive data to and from the server 200. The communication unit 110 may be connected to the communication network via a wireless communication protocol such as a GSM/3GPP series communication method (GSM, HSDPA, LTE advanced), a 3GPP2 series communication method (CDMA, etc.), or WiMAX, but the present invention is not limited thereto. For example, the communication unit 110 may be connected to the communication network through a conventional communication protocol or a communication protocol to be developed depending on development of a later technology.

The position detector 130 may be configured to detect a position of the customer terminal 100. For example, the position detector 130 may be configured to detect the position of the customer terminal 100 based on a GPS signal transmitted from a global positioning system (GPS) satellite, but the present invention is not limited thereto. For another example, the position detector 130 may be configured to detect the position of the customer terminal 100 by communicating with a plurality of base stations. In addition, the position detector 130 may be configured to detect the position of the customer terminal 100 by using not only a conventional position detection method, but also another position detection method to be provided depending on the development of a later technology.

The input and output unit 150 may be configured to display various information that is necessary for the car sharing service to the customer, and receive various inputs from a user. Specifically, the input and output unit 150 may be configured to display an interface for inputting vehicle use information to receive the vehicle use information from a customer, or may be configured to display recommendation information (e.g., position information) of a plurality of vehicles recommended by the server 300. In particular, the position information of the recommended vehicles may be displayed on a pre-stored map or a map transmitted from the server 300. In addition, the input and output unit 150 may be configured to display a path to a sharing vehicle or a path to a final destination. Particularly, the path to the sharing vehicle or the path to the final destination may be transmitted from the server 300. The sharing vehicle may be a vehicle selected and matched by the customer for sharing among the recommended vehicles transmitted by the server 300 to the customer terminal 100.

The input and output unit 150, for example, for displaying the above-described information, may include a display such as a plasma display panel (PDP), a liquid crystal display (LCD) panel, a light emitting diode (LED) panel, an organic light emitting diode (OLED) panel, an active-matrix organic light emitting diode (AMOLED) panel, or the like. The input and output unit 150, for example, for receiving information from the customer, may include a button input such as a keypad, a push button, or a membrane button, and a touch input such as a touch pad, and may also be implemented in the form of a touch screen in which both input and output are possible.

The storage 170 may be configured to store data, algorithms, etc. that are necessary for the customer terminal 100 to operate. According to an embodiment, the storage 170 may be configured to store an application related to the car-sharing service (hereinafter referred to as app), vehicle use information that is input from the customer through the input and output unit 150, a position of the customer terminal 100 detected by the position detector 130, a navigation program that displays a path to a sharing vehicle (or a path to a final destination), etc., but the present invention is not limited thereto. As another example, various data transmitted and received by the controller 190 to and from the server 300 through the communication unit 110 may be stored.

The storage 170, for example, may include a storage medium such as a random access memory (RAM), a static random access memory (SRAM), a read-only memory (ROM), a programmable read-only memory (PROM), and an electrically erasable programmable read-only memory (EEPROM).

The controller 190 may provide the car sharing service to the customer by operating the customer terminal 100 as a whole. For example, the control unit 190 may be configured to receive recommendation information for a plurality of vehicles transmitted by the server 300 through the communication unit 110, and display the recommendation information for the vehicles to the customer through the input output unit 150. In addition, the control unit 190 may be configured to receive various information (e.g., vehicle use information) input by the customer through the input and output unit 150, and may be configured to transmit the vehicle use information to the server 300 through the communication unit 110.

The vehicle terminal 200 is a terminal mounted on a vehicle used for the car sharing service. For example, the vehicle terminal 200 may be equipped with an AVN (audio video navigation), IVI (in-vehicle infotainment) system, or the like. In particular, in-vehicle infotainment (IVI) is a word obtained by combining information and entertainment, and is a mobility service that transfers information and provides entertainment at the same time.

Referring to FIG. 3, the vehicle terminal 200 may include a vehicle communication unit 210, a vehicle position detector 230, a vehicle input and output unit 250, a vehicle storage 270, and a vehicle controller 290. The vehicle communication unit 210 may be connected to a communication network to transmit and receive data to and from the server 200. The vehicle communication unit 210 may be connected to the communication network through various communication protocols in the same or similar manner to the communication unit 110 of the customer terminal 100 described above to transmit and receive data to and from the server 200.

The vehicle position detector 230 may be configured to detect a position of the vehicle terminal 200. For example, the vehicle position detector 230 may be configured to detect the position based on a GPS signal transmitted from a global positioning system (GPS) satellite, but the present invention is not limited thereto. For another example, the vehicle position detector 230 may be configured to detect the position of the vehicle terminal 200 by communicating with a plurality of base stations. In addition, the vehicle position detector 230 may be configured to detect the position of the vehicle terminal 200 by using not only a conventional position detection method, but also another position detection method to be provided depending on the development of a later technology.

The vehicle input/output unit 250 may be configured to display an interface for receiving a destination to receive destination information from a customer riding in a vehicle. In addition, the vehicle input and output unit 250 may be configured to display a path to the destination on a previously stored map or a map transmitted from the server 300. particular, the path to the final destination may be transmitted from the server 300.

The vehicle input/output unit 250, for example, for displaying the above-described information, may include a display such as a plasma display panel (PDP), identically or similarly to the input and output unit 150 of the customer terminal 100. The vehicle input/output unit 250, for example, for receiving destination information from the customer, may include a button input such as a keypad, identically or similarly to the input and output unit 150 of the customer terminal 100, and may also be implemented in the form of a touch screen in which both input and output are possible.

The vehicle storage 270 may be configured to store data, algorithms, etc. that are necessary for the vehicle terminal 200 to operate. According to an embodiment, the vehicle storage 270 may be configured to store an application related to the car-sharing service (hereinafter referred to as app), destination information input from the customer through the vehicle input/output unit 250, a position of the vehicle terminal 200 detected by the vehicle position detector 230, a navigation program that displays a path to a destination), etc., but the present invention is not limited thereto. As another example, various data transmitted and received by the vehicle controller 290 to and from the server 300 through the vehicle communication unit 210 may be stored. In addition, the vehicle storage 270 may include a storage medium such as a random access memory (RAM), a static random access memory (SRAM), etc., identically or similarly to the storage 170 of the customer terminal 100.

The vehicle controller 290 may provide the car sharing service to the customer by operating the vehicle terminal 200 as a whole. For example, the vehicle controller 290 may be configured to transmit real-time position information of the vehicle terminal 200 to the server 300 through the vehicle communication unit 210. The vehicle controller 290 may be configured to receive a message instructing completion of a reservation depending on successful matching with the customer from the server 300 through the vehicle communication unit 210.

The server 300 provides the car sharing service to the customer by matching the customer possessing the customer terminal 100 with the vehicle equipped with the vehicle terminal 200. According to an embodiment, the server 300 may be configured to estimate a possibility of using an eco-friendly vehicle based on a record of using the vehicle previously by the customer through the car sharing service (hereinafter, vehicle use record) and vehicle use information input by the customer through the customer terminal 100 to use the car sharing service. The server 300 may preferentially recommend an eco-friendly vehicle to a customer who is likely to use the eco-friendly vehicle in preference to an internal combustion engine vehicle.

Referring to FIG. 4, the server 300 may include a server communication unit 310, a server storage 330, and a server controller 350. The server communication unit 310 may be configured to transmit and receive data to and from each of the customer terminal 100 and the vehicle terminal 200 by using a communication protocol capable of communicating with each of the customer terminal 100 and the vehicle terminal 200.

The server storage 330 may be configured to store various types of information that is necessary to provide the car sharing service to a customer. For example, vehicle availability information and vehicle position information of the vehicle in which the vehicle terminal 200 is mounted may be stored. The vehicle availability information may include use state information (e.g., current use state or current non-use state) and use period information (e.g., weekday availability and weekend availability), and the like. In addition, the vehicle position information may include not only real-time position information of a current vehicle, but also position schedule information of the vehicle designated in the future by an owner (or manager) of the vehicle (e.g., near Gangnam Station on Monday, near Seocho-gu on Tuesday, etc.).

The server storage 330 may be configured to store a vehicle use record, which is a record of the customer that has previously used the vehicle. The vehicle use record may include a driving area recorded based on the position of the vehicle, a driving period and a driving distance calculated based on the position of the vehicle, a driving day calculated based on the driving period, and a driving purpose input by the customer. In addition, the vehicle use record may be recorded every time the vehicle is used. In other words, the server storage 330 may store vehicle use records separately for each number of times of use, and also store a total number of times of use.

The server storage 330 may be configured to store the vehicle use information transmitted by the customer to the server 300 through the customer terminal 100. The vehicle use information may include a use area designated by the customer as a pickup position of a sharing vehicle, a use distance that is a distance from the use area to a destination entered by the customer, a use day calculated based on the use period, and a driving purpose input by the customer. In particular, the sharing vehicle may be a vehicle selected and matched by the customer for sharing among the recommended vehicles transmitted by the server 300 to the customer terminal 100. When a customer transmits vehicle use information through the customer terminal 100 and applies for a car sharing service, the server controller 350 may be configured to calculate a first recommendation score and/or a second recommendation score to check a possibility of recommending an eco-friendly vehicle.

According to an embodiment, the server controller 350 may be configured to determine whether the customer terminal 100 is the customer terminal 100 of the customer who has previously used the vehicle for a reference number of times (e.g., 10 times) or more. When a customer who has sufficiently accumulated past history information capable of estimating past vehicle use patterns to some extent applies for the car sharing service, the server controller 350 may be configured to calculate the first recommendation score and the second recommendation score. When a customer who has sufficiently accumulated past history information capable of estimating past vehicle use patterns or a new customer who has no record of using the car sharing service applies for the car sharing service, the server controller 350 may be configured to calculate only the second recommendation score because there is not enough information to estimate a past vehicle usage pattern of the customer. In other words, the first recommendation score is an index for estimating the past vehicle use pattern of the customer, and may be a score indicating suitability for recommendation of an eco-friendly vehicle. The second recommendation score is an index for estimating a current vehicle usage pattern of the customer, and may be a score indicating suitability for recommendation of an eco-friendly vehicle.

For example, when a customer who has previously used a vehicle more than a reference number of times applies for the car sharing service, the server controller 350 may be configured to calculate the first recommendation score indicating suitability for recommendation of an eco-friendly vehicle based on the pre-stored vehicle use record of the customer. In addition, the server control unit 350 may be configured to calculate the second recommendation score indicating suitability for recommendation of an eco-friendly vehicle based on the vehicle use information received from the customer terminal 200. The server controller 350 may be configured to recommend an electric vehicle, a hybrid vehicle, or an internal combustion engine vehicle to the customer depending on the first recommendation score and the second recommendation score. In other words, as a result of the analysis of the first recommendation score, in response to determining that the past vehicle use pattern of the customer prefers the internal combustion engine vehicle, the server controller 350 may be configured to recommend the internal combustion engine vehicle by respecting tendency of the customer.

For another example, when a customer who has used less than the reference number of times or a new customer applies for the car sharing service, the server controller 350 may be configured to calculate the second recommendation score indicating suitability for recommendation of an eco-friendly vehicle based on the vehicle use information received from the customer terminal 200. The server controller 350 may be configured to recommend an electric vehicle or a hybrid vehicle to the customer depending on the first recommendation score and the second recommendation score. In other words, in the case of a new customer, the server controller 350 may be configured to preferentially recommend an eco-friendly vehicle rather than an internal combustion engine vehicle, thereby increasing a use rate of the eco-friendly vehicle. A more detailed description will be provided in conjunction with FIG. 5 to FIG. 8 below.

Figure 5:
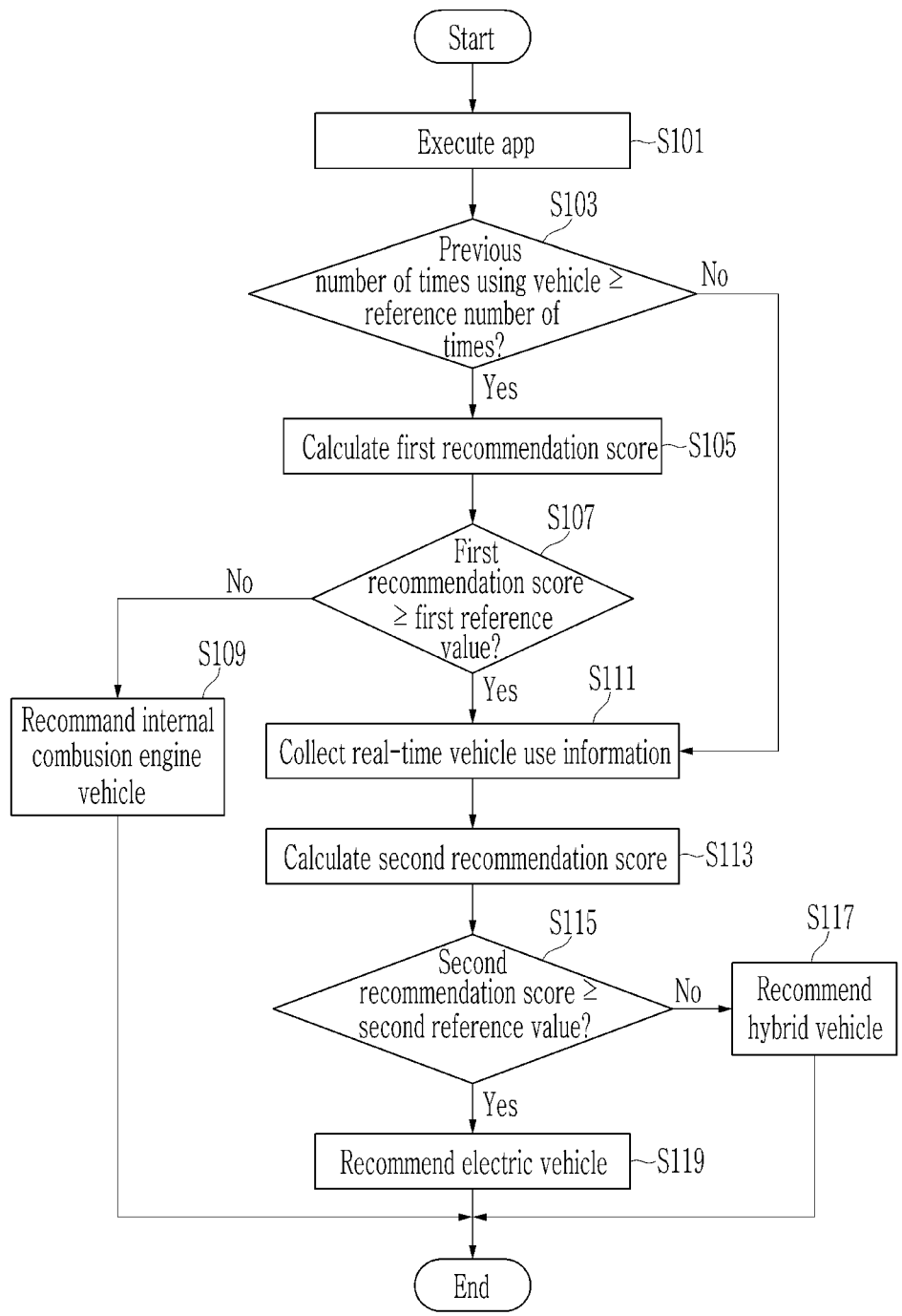
FIG. 5 illustrates a flowchart showing a vehicle recommendation method for a car sharing service according to an embodiment.
Figure 6:
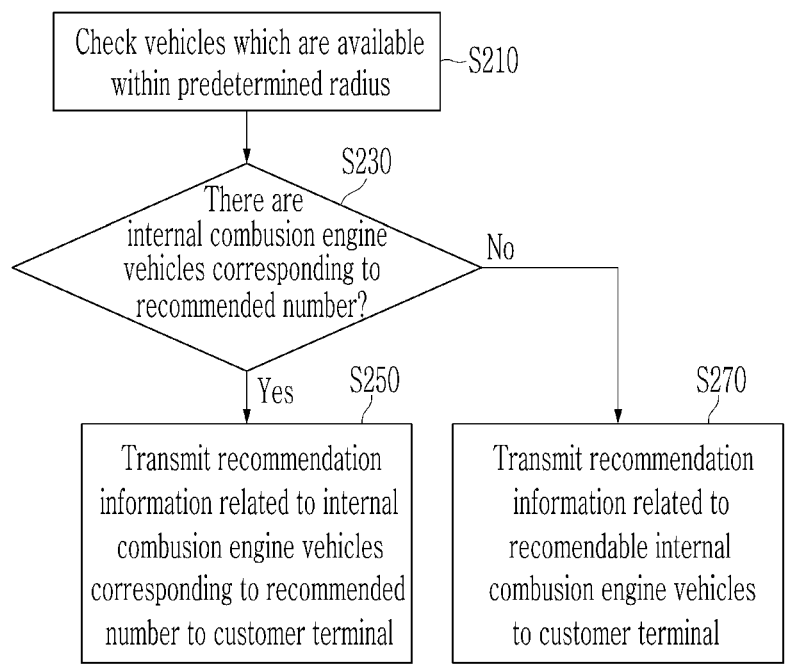
FIG. 6 illustrates a flowchart showing a recommendation step S109 for an internal combustion engine vehicle in FIG. 5 in detail.
Figure 7:
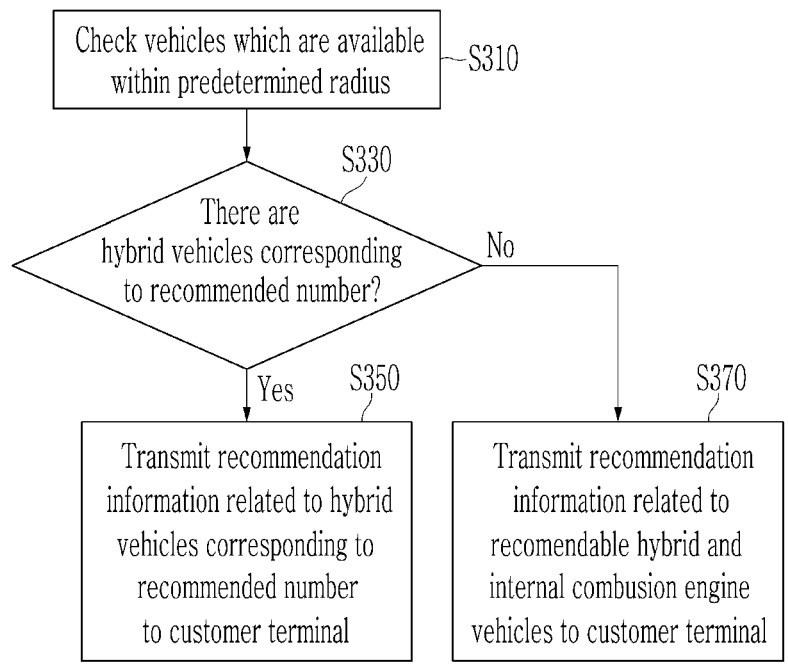
FIG. 7 illustrates a flowchart showing a recommendation step S117 for a hybrid vehicle in FIG. 5 in detail.
Figure 8:
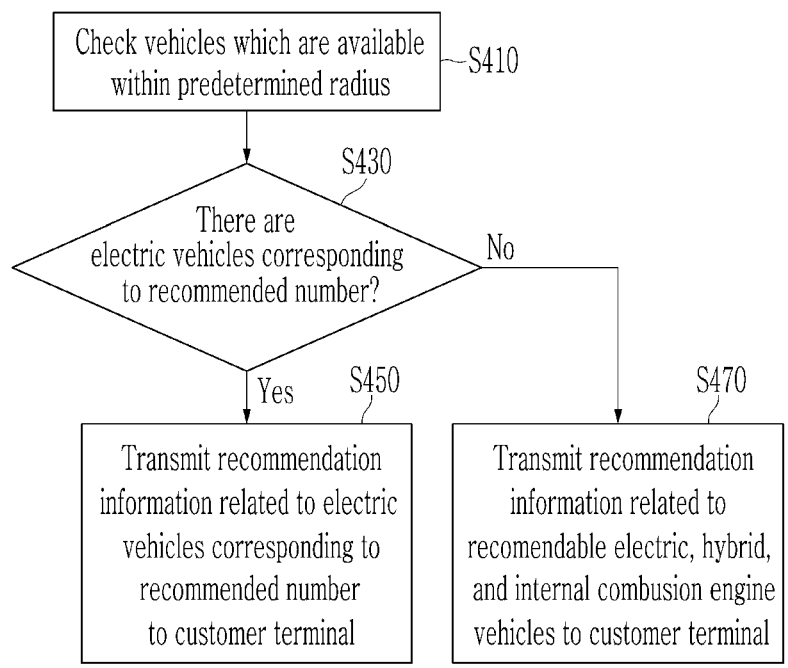
FIG. 8 illustrates a flowchart showing a recommendation step S119 for an electric vehicle in FIG. 5 in detail.

FIG. 5 illustrates a flowchart showing a vehicle recommendation method for a car sharing service according to an embodiment, FIG. 6 illustrates a flowchart showing a recommendation step S109 for an internal combustion engine vehicle in FIG. 5 in detail, FIG. 7 illustrates a flowchart showing a recommendation step S117 for a hybrid vehicle in FIG. 5 in detail, and FIG. 8 illustrates a flowchart showing a recommendation step S119 for an electric vehicle in FIG. 5 in detail.

Hereinafter, a vehicle recommendation system for a car sharing service and a method thereof will be described with reference to FIG. 1 to FIG. 8. Referring to FIG. 5, when a customer requests a car sharing service by executing an application (hereinafter, an app) through the customer terminal 100 (S101), the server 300 may be configured to determine whether a customer has already used the vehicle more than a predetermined reference number of times (S103).

For example, the customer may apply for the car sharing service by inputting vehicle use information through the customer terminal 100. In particular, the vehicle use information may include at least one of a use period, which is a total period of using the vehicle, a use area, which is a position to receive a sharing vehicle, destination information (position, etc.), and a use purpose (business or personal).

Next, as a result of the determination, when the customer has already used the vehicle less than a reference number of times or in the case of a new customer (S103, No), the server 300 performs steps after step S111 without performing a step of comparing a first recommended score and a first reference value, which will be described below. In other words, when the customer uses the vehicle less than the reference number of times or there is no record of using the car sharing service, the server 300 may be configured to recommend a vehicle in consideration of only the comparison result between the second recommendation score and the second reference value.

Next, as a result of the determination, when the customer has previously used the vehicle more than the reference number of times (S103, Yes), the server 300 may be configured to calculate the first recommendation score indicating suitability for recommendation of an eco-friendly vehicle based on the pre-stored vehicle use record of the customer (S105). For example, the reference number may be calculated as 5 times, 10 times, or the like.

The server 300 may be configured to classify a driving area as a city area or a non-city area based on the vehicle use record of each number of times of using the vehicle, and calculates the first driving score by multiplying a score mapped to the classified driving area item by a first weight. In addition, the server 300 may be configured to classify the driving distance as an area having greater than a reference distance or an area having less than the reference distance, and calculate the second driving score by multiplying the score mapped to the classified driving distance item by a second weight. In addition, the server 300 may be configured to classify driving days as weekdays or weekends, and calculate a third driving score by multiplying a score mapped to the classified driving day item by a third weight. In addition, the server 300 may be configured to classify the driving purpose as personal or business purpose, and calculate a fourth driving score by multiplying the score mapped to the classified driving purpose item by a fourth weight.

According to an embodiment, the server 300 may be configured to calculate a driving score corresponding to each number of times of use by adding at least two of the first driving score, the second driving score, the third driving score, or the fourth driving score, and then calculates a total driving score by adding the driving score of each of the total numbers of times of use. A most optimal method may include calculating, by the server 300, a driving score corresponding to each number of times of use by adding the first driving score, the second driving score, the driving score, and the driving score. In addition, the server 300 may be configured to calculate a first recommended score, which is an average value of all driving scores.

According to another embodiment, the server 300 may be configured to calculate the driving score corresponding to each number of times of use based on the first driving score, the second driving score, the third driving score, or the fourth driving score. In other words, the server 300 may be configured to determine any one of the first driving score, the second driving score, the third driving score, and the fourth driving score as the driving score. The server 300 may be configured to calculate the total driving score by adding the driving score of each of the total numbers of times of use, and ay calculate a first recommended score that is an average value of the total driving scores.

Hereinafter, Table 1 shows an example of assuming that the number of times of using the vehicle is 10 times, and allowing the server 300 to calculate the first recommendation score based on the vehicle driving record for each number of use. It is assumed that a first weight W1 for the driving area is 1, a second weight for the driving distance is 0.7, a third weight for the driving day is 0.5, and a fourth weight for the driving purpose is 0.5.

It is assumed that the score mapped to the city area (or metropolitan area) item of the driving area is a 7 score, and the score mapped to the non-city area (or non-metropolitan area) item is a 3 score. In the case of the city area, since there is a high probability that an infrastructure for electric vehicles such as an electric charging station will be provided, and there is a high possibility that electric vehicles exist, a higher score may be given to the city item than the non-city item. For example, the server 300 may be configured to analyze an area in which the vehicle has been driven in the past, and classify the driving area as a city item or a non-city item based on a main area in which the vehicle has been driven during a driving period.

In the case of the driving distance, it is assumed that the score mapped to the item above the reference distance (Nkm) is a 7 score, and the score mapped to the item less than the reference distance (Nkm) is a 3 score. When a customer drives a vehicle over the reference distance (Nkm), it is highly likely that the customer will pass an electric charging station, and a higher score may be given to the item above the reference distance (Nkm) than the item less than the reference distance (Nkm). For example, the server 300 may be configured to analyze a total distance traveled by the vehicle during the driving period, and classify the driving distance as the item above the reference distance (Nkm) or the item less than the reference distance (Nkm).

In the case of the driving days, it is assumed that the score mapped to a weekday item is a 7 score, and the score mapped to a weekend item is a 3 score. When the customer uses the vehicle on weekdays, it is highly likely to drive the vehicle in the city area where an infrastructure for electric vehicles is equipped, and traffic congestion is expected, and thus it is necessary for environmental protection to recommend an electric vehicle, so the weekday item may be given a higher score than the weekend item. For example, the server 300 may be configured to count weekdays and weekends during the driving period, and classify the driving days as the weekday item or the weekend item based on days having a greater number of counts.

In the case of the driving purpose, it is assumed that the score mapped to the business item is a 7 score and the score mapped to the personal item is a 3 score. When the customer uses the vehicle for business purpose, it is highly likely to drive the vehicle in the city area where an infrastructure for electric vehicles is equipped, and traffic congestion is expected, and thus it is necessary for environmental protection to recommend an electric vehicle, so the business item may be given a higher score than the personal item. For example, when a customer makes a reservation for a car sharing service to use a vehicle, the server 300 may be configured to classify the operation purpose as the business item or the personal item based on the driving purpose collected by requesting the customer through the customer terminal 100.

TABLE 1

| Times | ① Driving area (W1 = 1) | | ② Driving distance (W2 = 0.7) | | ③ Driving days (W3 = 0.5) | | ④ Driving purpose (W4 = 0.5) | | Driving score |
|---|---|---|---|---|---|---|---|---|---|
| | City (7 score) | Non-city (3 score) | Nkm or more (7 score) | Less than Nkm (3 score) | Weekdays (7 score) | Weekends (3 score) | Business (7 score) | Personal (3 score) | |
| 1  | 7*1 |     | 7*0.7 |       | 7*0.5 |       | 7*0.5 |       | 18.9 |
| 2  | 7*1 |     | 7*0.7 |       | 7*0.5 |       | 7*0.5 |       | 18.9 |
| 3  | 7*1 |     | 7*0.7 |       | 7*0.5 |       | 7*0.5 |       | 18.9 |
| 4  | 7*1 |     | 7*0.7 |       | 7*0.5 |       | 7*0.5 |       | 18.9 |
| 5  | 7*1 |     | 7*0.7 |       | 7*0.5 |       | 7*0.5 |       | 18.9 |
| 6  | 7*1 |     | 7*0.7 |       | 7*0.5 |       | 7*0.5 |       | 18.9 |
| 7  |     | 3*1 |       | 3*0.7 |       | 3*0.5 |       | 3*0.5 | 8.1 |
| 8  |     | 3*1 |       | 3*0.7 |       | 3*0.5 |       | 3*0.5 | 8.1 |
| 9  |     | 3*1 |       | 3*0.7 |       | 3*0.5 |       | 3*0.5 | 8.1 |
| 10 |     | 3*1 |       | 3*0.7 |       | 3*0.5 |       | 3*0.5 | 8.1 |
| | | | | | First recommendation score: 14.58 | | | | 14.58 (145.8/10) |

Referring to Table 1, it is assumed that the customer has used the vehicle for business purpose on weekdays over the reference distance (Nkm) in the city area in a first to a sixth time out of a total of 10 times using the vehicle. In addition, in a seventh to a tenth time, it is assumed that the customer uses the vehicle for personal purpose on weekends less than the reference distance (Nkm) in the non-city area. In addition, details described in Table 1 may be vehicle use records.

The server 300 may be configured to classify the driving area of the vehicle as the city area based on the vehicle use record of the first time, and calculate the first driving score of 7 score (7×1) by multiplying a 7 score, which is a score mapped to the city area item, by 1, which is the first weight W1. The server 300 may be configured to classify the driving distance of the vehicle as the reference distance (Nkm) or more, and calculate a second driving score of 4.9 (7×0.7) by multiplying the 7 score, which is a score mapped to the item above the reference distance (Nkm), by 0.7, which is the second weight W2. The server 300 may be configured to classify the driving days of the vehicle as weekdays, and calculate a third driving score of 3.5 (7×0.5) by multiplying 7, which is a score mapped to the weekday item, by 0.5, which is the third weight W3.

The server 300 may be configured to classify the driving purpose of the vehicle as business purpose, and calculate a fourth driving score of 3.5 (7×0.5) by multiplying 7, which is a score mapped to the business item, by 0.5, which is the fourth weight W4. The server 300 may be configured to classify the driving score 18.9 corresponding to the first time by adding the first driving score of a 7 score (7×1), the second driving score of a 4.9 score (7×0.7), the third driving score of a 3.5 score (7×0.5), and the fourth driving score of a 3.5 score (7×0.5). The server 300 may be configured to calculate a second driving score (18.9), a third driving score (18.9), a fourth driving score (18.9), a fifth driving score (18.9), and a sixth driving score (18.9) based on the vehicle use records of each of the second to sixth times in a same way.

The server 300 may be configured to classify the driving area of the vehicle as the non-city area based on the vehicle use record of the seventh time, and calculate the first driving score of a 3 score (3×1) by multiplying a 3 score, which is a score mapped to the non-city area item, by 1, which is the first weight W1. The server 300 may be configured to classify the driving distance of the vehicle as the reference distance (Nkm) or less, and calculate a second driving score of 2.1 (3×0.7) by multiplying a 3 score, which is a score mapped to the item of less than the reference distance (Nkm), by 0.7, which is the second weight W2. The server 300 may be configured to classify the driving days of the vehicle as the weekend item, and calculates a third driving score of 1.5 (3×0.5) by multiplying 3, which is a score mapped to the weekend item, by 0.5, which is the third weight W3. The server 300 may be configured to classify the driving purpose of the vehicle as the personal item and calculates a fourth driving score of 1.5 (3×0.5) by multiplying 3, which is a score mapped to the weekend item, by 0.5, which is the fourth weight W4. The server 300 may be configured to calculate the driving score 8.1 corresponding to the first time by adding the first driving score of a 3 score (3×1), the second driving score of a 2.1 score (3×0.7), the third driving score of a 1.5 score (3×0.5), and the fourth driving score of a 1.5 score (3×0.5).

The server 300 may be configured to calculate an eighth driving score (8.1), a ninth driving score (8.1), and a tenth driving score (8.1) based on the vehicle use records of each of the eight to tenth times in a same way. The server 300 may be configured to calculate a total driving score of 145.8 by adding the driving score of each of the total of 10 times, and calculate the first recommendation score (14.58), which is an average value (14.58=145.8/10) of the total driving score of 145.8.

Next, the server 300 may be configured to determine whether the first recommendation score is equal to or greater than a first reference value (S107). In particular, the first reference value, which is a score that is considered suitable for recommending an eco-friendly vehicle, may be calculated through various experiments and data analysis. For example, the first reference value may be calculated as 13.5. Next, when the first recommendation score is less than the first reference value (S107, No), the server 300 may be configured to determine that a recommendation for an internal combustion engine vehicle is possible (S109).

When the first recommendation score is less than the first reference value, the server 300 estimates that the customer who wants to use the car sharing service is less likely to use the eco-friendly vehicle. In other words, as a result of the analysis of the first recommendation score, in response to determining that the past vehicle use pattern of the customer prefers the internal combustion engine vehicle, the server 300 may be configured to recommend the internal combustion engine vehicle by respecting tendency of the customer.

Referring to FIG. 6, in step S109, the server 300 may be configured to check vehicles which are available during a use period requested by the customer among a plurality of vehicles positioned within a predetermined radius based on a use area that is designated by the customer as a receiving position of the vehicle (S210). For example, the predetermined radius may be set to a distance that the customer can walk in the using area (a distance within 15 minutes on foot, etc.).

In step S109, the server 300 may be configured to determine whether a plurality of internal combustion engine vehicles corresponding to a predetermined recommended number exist among the checked vehicles (S230). In particular, the recommended number may be calculated as an appropriate number in consideration of duplicate recommendation of a same vehicle to other customers. For example, the recommended number may be set to three. In step S109, when the internal combustion engine vehicles exist as a determination result thereof (S230, Yes), the server 300 may be configured to transmit recommendation information for the internal combustion engine vehicles corresponding to the recommended number to the customer terminal 100 (S250).

Particularly, the recommendation information may include distance information from the use area to the recommended vehicle. For example, the server 300 may be configured to operate the customer terminal 100 such that the recommendation information is displayed on the customer terminal 100 in the order of vehicles approaching the use area. In step S109, when the internal combustion engine vehicles do not exist as the determination result thereof (S230, No), the server 300 may be configured to transmit recommendation information related to a recommendable internal combustion engine vehicle to the customer terminal 100 (S270). For example, when there is one recommended internal combustion engine vehicle, the server 300 may be configured to transmit recommendation information of the one internal combustion engine vehicle to the customer terminal 100.

Next, when the first recommendation score is equal to or greater than the first reference value (S107, Yes), the server 300 may be configured to collect vehicle use information input by the customer through the customer terminal 100 for car sharing (S111). For example, when the customer has already transmitted vehicle use information to the server 300 through the customer terminal 100, the server 300 may be configured to extract the vehicle use information stored in the server storage 330. For another example, when the customer does not transmit vehicle use information to the server 300 through the customer terminal 100, the server 300 may be configured to request the vehicle use information to receive it from the customer terminal 100. Next, the server 300 may be configured to calculate a second recommendation score indicating suitability for recommendation of an eco-friendly vehicle based on the vehicle use information (S113).

The server 300 may be configured to classify a use area into a city area or a non-city area based on the vehicle use information, and calculate a first use score by multiplying a score mapped to the classified use area item by a first weight. In addition, the server 300 may be configured to classify a use distance, which is a distance from the use area to a destination input by the customer, as more than or less than a reference distance, and calculate a second use score by multiplying a score mapped to the classified use distance item by a second weight. In addition, the server 300 may be configured to classify use days as weekdays or weekends, and calculate a third use score by multiplying a score mapped to the classified use day item by a third weight. In addition, the server 300 may be configured to classify the use purpose as a personal or business purpose, and calculate a fourth use score by multiplying the score mapped to the classified use purpose item by a fourth weight.

According to an embodiment, the server 300 may be configured to calculate the second recommendation score by adding at least two of the first use score, the second use score, the third use score, or the fourth use score. As a most optimal method, the server 300 may be configured to calculate the second recommendation score by adding the first use score, the second use score, the third use score, and the fourth use score. For example, in providing a car sharing service, it may not be easy to collect use purpose information from the customer. Then, the server 300 may be configured to calculate the above-described first use score, second use score, and third use score. In addition, the server 300 may be configured to calculate the second recommendation score by adding the first use score, the second use score, and the third use score. In particular, the second reference value may also be calculated differently.

For another example, in providing a car sharing service, it may not be easy to collect destination information and use purpose information from the customer. Then, the server 300 may be configured to calculate the above-described first use score and third use score. In addition, the server 300 may be configured to calculate the second recommendation score by adding the first use score and the third use score. In particular, the second reference value may also be calculated differently.

According to another embodiment, the server 300 may be configured to calculate the second recommendation score based on the first use score, the second use score, the third use score, or the fourth use score. In other words, the server 300 may be configured to determine any one of the first use score, the second use score, the third use score, and the fourth use score as the second recommendation score. Hereinafter, Table 2 is an example of calculating the second recommendation score based on vehicle driving information. It is assumed that a first weight W1 for the use area is 1, a second weight for the use distance is 0.7, a third weight for the use day is 0.5, and a fourth weight for the use purpose is 0.5.

It is assumed that the score mapped to the city area (or metropolitan area) item of the use area is a 7 score, and the score mapped to the non-city area (or non-metropolitan area) item is a 3 score. For example, the server 300 may be configured to estimate a distance at which a sharing vehicle will be driven based on an expected path and use period from the use area, which is a receiving position of a sharing vehicle, to a destination inputted by the customer, and may classify the estimated distance, which is the driving distance, into an item above the reference distance (Nkm) or an item less than the reference distance (Nkm).

In the case of the use days, it is assumed that the score mapped to a weekday item is a 7 score, and the score mapped to a weekend item is a 3 score. For example, the server 300 may be configured to count weekdays and weekends during the use period input by the customer, and classify the use days as the weekday item or the weekend item based on days having a greater number of counts.

In the case of the use purpose, it is assumed that the score mapped to the business item is a 7 score and the score mapped to the personal item is a 3 score. For example, the server 300 may be configured to classify the use purpose as the business item or the personal item based on the use purpose collected by requesting the customer through the customer terminal 100.

TABLE 2

| ⑤ Driving area (W1 = 1) | | ⑥ Driving distance (W2 = 0.7) | | ⑦ Driving days (W3 = 0.5) | | ⑧ Driving purpose (W4 = 0.5) | |
|---|---|---|---|---|---|---|---|
| City (7 score) | Non-city (3 score) | Nkm or more (7 score) | Less than Nkm (3 score) | Weekdays (7 score) | Weekends (3 score) | Business (7 score) | Personal (3 score) |
| | 3*1 | 7*0.7 | | 7*0.5 | | | 3*0.5 |
| | | | Second recommendation score: 12.9 | | | | |

Referring to Table 2, it is assumed that the customer wants to receive the sharing vehicle in the non-city area, a distance at which the customer will travel by driving the sharing vehicle (hereafter, the distance used) is more than the reference distance (Nkm), and the customer requests the car sharing service because the customer wants to use the vehicle for a personal purpose on weekdays. In addition, details described in Table 2 may be vehicle use information.

The server 300 may be configured to classify the driving area of the vehicle as the non-city area based on the vehicle use information, and calculate the first driving score of a 3 score (3×1) by multiplying the 3 score, which is a score mapped to the non-city area item, by 1, which is the first weight W1. The server 300 may be configured to classify the use distance of the vehicle as the reference distance (Nkm) or more, and calculates a second use score of 4.9 (7×0.7) by multiplying a 7 score, which is a score mapped to the item above the reference distance (Nkm), by 0.7, which is the second weight W2. The server 300 may be configured to classify the use days of the vehicle as weekdays, and calculates a third use score of 3.5 (7×0.5) by multiplying by 7, which is a score mapped to the weekday item, by 0.5, which is the third weight W3. The server 300 may be configured to classify the use purpose of the vehicle as the personal item and calculates a fourth use score of 3.5 (3×0.5) by multiplying by 3, which is a score mapped to the weekend item, by 0.5, which is the fourth weight W4. The server 300 may be configured to calculate a second recommendation score 12.9 by adding the first use score of a 3 score (3×1), the second use score of a 4.9 score (7×0.7), the third use score of a 3.5 score (7×0.5), and the fourth use score of a 1.5 score (3×0.5).

Next, the server 300 may be configured to determine whether the second recommendation score is equal to or greater than a second reference value (S115). In particular, the second reference value, which is a score that is considered suitable for recommending an eco-friendly vehicle, may be calculated through various experiments and data analysis. For example, the second reference value may be calculated as 13.5 or the like. Next, when the second recommendation score is less than the second reference value (S115, No), the server 300 may be configured to determine that a recommendation for a hybrid vehicle is possible (S117).

For example, when the first recommendation score is greater than or equal to the first reference value, but the second recommendation score is less than the second reference value, the server 300 may be configured to estimate that the customer is unlikely to use an electric vehicle at a time of currently using the car sharing service, although the past vehicle usage pattern of the customer indicates that it is highly likely to use an eco-friendly vehicle. Then, the server 300 may be configured to recommend a hybrid vehicle that is more environmentally friendly than an internal combustion engine vehicle as a next best solution.

For another example, in the case where there is no evaluation of the first recommendation score but the second recommendation score is less than the second reference value (S103, No) (S111), the server 300 may be configured to estimate that a possibility of using an electric vehicle is low when a customer who has used the vehicle less than the reference number of times or a new customer who has no record of using the car sharing service is currently using the car sharing service. Then, the server 300 may be configured to recommend a hybrid vehicle that is more environmentally friendly than an internal combustion engine vehicle as a next best solution.

Referring to FIG. 7, in step S117, the server 300 may be configured to check vehicles which are available during a use period requested by the customer among a plurality of vehicles positioned within a predetermined radius based on a use area that is designated by the customer as a receiving position of the vehicle (S310). For example, the predetermined radius may be set to a distance that the customer can walk in the using area (a distance within 15 minutes on foot, etc.).

In step S117, the server 300 may be configured to determine whether a plurality of hybrid vehicles corresponding to a predetermined recommended number exist among the checked vehicles (S330). In particular, the recommended number may be calculated as an appropriate number in consideration of duplicate recommendations of a same vehicle to other customers. For example, the recommended number may be set to three. In step S117, when the internal combustion engine vehicle exists as a determination result thereof (S330, Yes), the server 300 may be configured to transmit recommendation information for the hybrid vehicles corresponding to the recommended number to the customer terminal 100 (S350).

Particularly, the recommendation information may include distance information from the use area to the recommended vehicle. For example, the server 300 may control the customer terminal 100 such that the recommendation information is displayed on the customer terminal 100 in the order of hybrid vehicles approaching the use area. In step S117, when the hybrid vehicles do not exist as the determination result thereof (S330, No), the server 300 may be configured to transmit the recommendation information related to a recommendable hybrid vehicle and internal combustion engine vehicle to the customer terminal 100 (S370). For example, when there is one recommended hybrid vehicle and two internal combustion engine vehicles, the server 300 may be configured to transmit recommendation information of the corresponding vehicles to the customer terminal 100. Next, when the second recommendation score is greater than or equal to the second reference value (S115, Yes), the server 300 may be configured to determine that a recommendation for an electric vehicle is possible (S119).

Referring to FIG. 8, in step S119, the server 300 may be configured to check vehicles which are available during a use period requested by the customer among a plurality of vehicles positioned within a predetermined radius based on a use area that is designated by the customer as a receiving position of the vehicle (S410). For example, the predetermined radius may be set to a distance that the customer can walk in the using area (a distance within 15 minutes on foot, etc.).

In step S119, the server 300 may be configured to determine whether a plurality of electric vehicles corresponding to a predetermined recommended number exist among the checked vehicles (S430). In particular, the recommended number may be calculated as an appropriate number in consideration of duplicate recommendation of a same vehicle to other customers. For example, the recommended number may be set to three. In step S119, when the internal combustion engine vehicle exists as a determination result thereof (S430, Yes), the server 300 may be configured to transmit recommendation information for the electric vehicles corresponding to the recommended number to the customer terminal 100 (S450).

Particularly the recommendation information may include distance information from the use area to the recommended vehicle. For example, the server 300 may be configured to operate the customer terminal 100 such that the recommendation information is displayed on the customer terminal 100 in the order of electric vehicles approaching the use area. In step S119, when the hybrid vehicles do not exist as the determination result thereof (S430, No), the server 300 may be configured to transmit recommendation information related to a recommendable electric vehicle, hybrid vehicle, and internal combustion engine vehicle to the customer terminal 100 (S370). For example, when there is one recommended electric vehicle and two hybrid vehicles, the server 300 may be configured to transmit recommendation information of the corresponding vehicles to the customer terminal 100. For another example, when there is one recommended electric vehicle, one hybrid vehicle, and two internal combustion engine vehicles, the server 300 may be configured to transmit recommendation information of the corresponding vehicles to the customer terminal 100.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A vehicle recommendation system that recommends a vehicle to a customer intending to use a car sharing service, the system comprising:
    a server configured to calculate a first recommendation score indicating suitability for recommendation of the vehicle based on a previously stored vehicle use record for the customer, receive vehicle use information for using the car sharing service from a customer terminal possessed by the customer, and calculate a second recommendation score indicating suitability for recommendation of the vehicle based on the vehicle use information; and
    a vehicle terminal mounted on the vehicle associated with the car sharing service, the vehicle terminal including a vehicle controller for transmitting position information of the vehicle terminal to the server and receiving a message from the server,
    wherein the server is configured to transmit recommendation information related to an internal combustion engine vehicle, a hybrid vehicle, or an electric vehicle to the customer terminal based on at least one of a result of comparing the first recommended score with a predetermined first reference value or a result of comparing the second recommended score with a predetermined second reference value, and
    wherein the server is configured to transmit the message upon reserving the vehicle based on the at least one of the result of comparing the first recommended score with the predetermined first reference value or the result of comparing the second recommended score with the predetermined second reference value.

2. The vehicle recommendation system of claim 1, wherein the server, when the customer terminal is a customer terminal of a customer who has already used ft the vehicle more than a reference number of times, is configured to calculate the first recommendation score, and when the first recommendation score is less than the first reference value, determine that a recommendation for the internal combustion engine vehicle is possible.

3. The vehicle recommendation system of claim 2, wherein the server, when the first recommendation score is greater than or equal to the first reference value, is configured to calculate the second recommendation score, when the second recommendation score is less than the second reference value, determine that a recommendation for the hybrid vehicle is possible, and when the second recommendation score is equal to or greater than the second reference value, determine that a recommendation for the electric vehicle is possible.

4. The vehicle recommendation system of claim 3, wherein the server, when the customer terminal is a customer terminal of a customer who has used the vehicle less than the reference number of times or a new customer who has no record of using the car sharing service, is configured to calculate the second recommendation score, and when the second recommendation score is less than the second reference value, determines that a recommendation for the hybrid vehicle is possible, and when the second recommendation score is equal to or greater than the second reference value, determine that a recommendation for the electric vehicle is possible.

5. The vehicle recommendation system of claim 4, wherein the server, based on vehicle use record of each of total numbers of times at which the customer used the vehicle, is configured to:
    classify a driving area as a city or non-city area, and calculates a first driving score by multiplying the score mapped to the classified driving area by a first weight;
    classify a driving distance as greater than or equal to, or less than the reference distance, and calculates a second driving score multiplying a score mapped to the classified driving distance by a second weight;
    classify driving days as weekdays or weekends, and calculate a third driving score by multiplying a score mapped to the classified driving days by a third weight;
    classify driving purpose as personal or business purpose, and calculate a fourth driving score by multiplying a score mapped to the classified driving purpose by a fourth weight;
    calculate a driving score corresponding to each of numbers of times of use by adding at least two of the first driving score, the second driving score, the third driving score, or the fourth driving score; and
    calculate a total driving score by adding the driving score corresponding to each of the total numbers of times of use, and calculates a first recommended score, which is an average value of the total driving scores.

6. The vehicle recommendation system of claim 5, wherein the server is configured to calculate the driving score corresponding to each of the numbers of times of use based on the first driving score, the second driving score, the third driving score, or the fourth driving score.

7. The vehicle recommendation system of claim 4, wherein the server, based on the vehicle use information, is configured to:
classify a use area designated by the customer as a receiving position of the vehicle as a city or non-city area, and calculate a first use score by multiplying a score mapped to the classified position by a first weight;
classify a use distance, which is a distance from the use area to the destination that is inputted by the customer, as greater than or equal to, or less than a reference distance, and calculate a second use score by multiplying a score mapped to the classified distance by a second weight;
classify use days as weekdays or weekends, and calculate a third use score by multiplying a score mapped to the classified days of the week by a third weight;
classify a use purpose as a personal or business purpose, and calculates a fourth use score by multiplying a score mapped to the classified purpose by a fourth weight; and
calculate the second recommendation score by adding at least two of the first use score, the second use score, the third use score, or the fourth use score.

8. The vehicle recommendation system of claim 7, wherein the server is configured to calculate the second recommendation score based on the first use score, the second use score, or the third use score.

9. The vehicle recommendation system of claim 4, wherein the server, is configured to:
in response to determining that the recommendation for the hybrid vehicle is possible, check vehicles which are available during a use period requested by the customer among a plurality of vehicles positioned within a predetermined radius based on a use area that is designated by the customer as a receiving position of the vehicle, and
when a plurality of hybrid vehicles corresponding to a predetermined recommended number exist among the checked vehicles, transmit recommendation information related to the hybrid vehicles corresponding to the recommended number to the customer terminal.

10. The vehicle recommendation system of claim 9, wherein the server, when the hybrid vehicles corresponding to the recommended number does not exist among the checked vehicles, is configured to transmit recommendation information related to a plurality of recommendable hybrid vehicles and internal combustion engine vehicles to the customer terminal.

11. The vehicle recommendation system of claim 4, wherein the server, is configured to:
in response to determining that the recommendation for the electric vehicle is possible, check vehicles which are available during a use period requested by the customer among a plurality of vehicles positioned within a predetermined radius based on a use area that is designated by the customer as a receiving position of the vehicle, and
when a plurality of electric vehicles corresponding to a predetermined recommended number exist among the checked vehicles, transmit recommendation information related to the electric vehicles corresponding to the recommended number to the customer terminal.

12. The vehicle recommendation system of claim 11, wherein the server, when the electric vehicles corresponding to the recommended number do not exist among the checked vehicles, is configured to transmit recommendation information related to recommendable electric vehicles and hybrid vehicles to the customer terminal.

13. A vehicle recommendation method that recommends a vehicle to a customer who wants to use a car sharing service, the method comprising:
providing a server having a controller, a customer terminal of a customer, and a vehicle terminal mounted on the vehicle associated with the car sharing service, the vehicle terminal including a vehicle controller for transmitting position information of the vehicle terminal to the server and receiving a message from the server;
determining, by the controller, whether the customer has already used the vehicle more than a predetermined reference number of times;
calculating, by the controller, a first recommendation score indicating suitability for recommendation of the vehicle based on a re-stored vehicle use record of the customer when the customer used the vehicle more than the reference number of times as a result of the determination;
determining, by the controller, whether the first recommendation score is greater than or equal to the first reference value;
calculating, by the controller, a second recommendation score indicating suitability for recommendation of the vehicle based on vehicle use information inputted by the customer through the customer terminal when the first recommended score is equal to or greater than the first reference value as a result of the determination;
determining, by the controller, whether the second recommendation score is greater than or equal to a second reference value;
transmitting, by the controller, recommendation information related to a plurality of electric vehicles, each having an associated vehicle terminal, corresponding to a predetermined recommended number to the customer terminal when the second recommendation score is equal to or greater than a second reference value as a result of the determination; and
transmitting the message upon reserving the vehicle based on at least one of a result of comparing the first recommended score with the first reference value or a result of comparing the second recommended score with the second reference value.

14. The vehicle recommendation method of claim 13, wherein, when the customer uses the vehicle at less than the reference number of times or there is no record of using the vehicle as a result of the determination, the calculating of the second recommendation score is performed.

15. The vehicle recommendation method of claim 13, wherein the calculating of the first recommendation score includes:
based on vehicle use record of each of total numbers of times at which the customer used the vehicle, classifying a driving area as a city or non-city area, and calculating a first driving score by multiplying the score mapped to the classified driving area by a first weight;
classifying a driving distance as greater than or equal to, or less than the reference distance, and calculating a second driving score by multiplying a score mapped to the classified driving distance by a second weight; and classifying driving days as weekdays or weekends, and calculating a third driving score by multiplying a score mapped to the classified driving days by a third weight;

classifying driving purpose as personal or business purpose, and calculating a fourth driving score by multiplying a score mapped to the classified driving purpose by a fourth weight;

calculating a driving score corresponding to each of numbers of times of use by adding at least two of the first driving score, the second driving score, the third driving score, or the fourth driving score; and calculating a total driving score by adding the driving score corresponding to each of the total numbers of times of use, and calculating a first recommended score, which is an average value of the total driving scores.

16. The vehicle recommendation method of claim 15, wherein the calculating of the first recommendation score includes:

calculating the driving score corresponding to each of the numbers of times of use based on the first driving score, the second driving score, the third driving score, or the fourth driving score.

17. The vehicle recommendation method of claim 13, wherein the calculating of the second recommendation score includes:

based on the vehicle use information, classifying a use area inputted by the customer as a receiving position of the vehicle as a city or non-city area, and calculating a first use score by multiplying a score mapped to the classified position by a first weight;

classifying a use distance, which is an estimated distance from the use area to the destination that is inputted by the customer, as greater than or equal to, or less than a reference distance, and calculating a second use score by multiplying a score mapped to the classified distance by a second weight;

classifying use days as weekdays or weekends, and calculating a third use score by multiplying a score mapped to the classified days of the week by a third weight;

classifying use purpose as personal or business purpose, and calculating a fourth use score by multiplying a score mapped to the classified purpose by a fourth weight; and calculating the second recommendation score by adding at least two of the first use score, the second use score, the third use score, or the fourth use score.

18. The vehicle recommendation method of claim 17, wherein the calculating of the second recommendation score includes:

calculating the second recommendation score based on the first use score, the second use score, or the third use score.

19. The vehicle recommendation method of claim 13, wherein the transmitting of the recommendation information related to the electric vehicles includes:

checking vehicles which are available during a use period requested by the customer among a plurality of vehicles positioned within a predetermined radius based on a use area that is designated by the customer as a receiving position of the vehicle;

determining whether there are a plurality of electric vehicles corresponding to a predetermined recommended number among the checked vehicles; and transmitting recommendation information related to the electric vehicles corresponding to the recommended number to the customer terminal when there are the electric vehicles corresponding to the recommended number.

20. The vehicle recommendation method of claim 19, further comprising:

transmitting recommendation information related to recommendable electric vehicles to the customer terminal when there are no electric vehicles corresponding to the recommended number as a result of the determination.

21. The vehicle recommendation method of claim 13, further comprising:

when the second recommendation score is less than a second reference value as a result of the determination, transmitting recommendation information related to a plurality of hybrid vehicles corresponding to the recommended number to the customer terminal.

22. The vehicle recommendation method of claim 21, wherein the transmitting of the recommendation information related to the hybrid vehicles includes:

checking vehicles which are available during a use period requested by the customer among a plurality of vehicles positioned within a predetermined radius based on a use area that is designated by the customer as a receiving position of the vehicle;

determining whether there are a plurality of hybrid vehicles corresponding to a predetermined recommended number among the checked vehicles; and transmitting recommendation information related to the hybrid vehicles corresponding to the recommended number to the customer terminal when there are the hybrid vehicles corresponding to the recommended number.

23. The vehicle recommendation method of claim 22, wherein transmitting recommendation information related to recommendable hybrid vehicles and internal combustion engine vehicles to the customer terminal when there are no hybrid vehicles corresponding to the recommended number as a result of the determination.

* * * * *